United States Patent
Rapowitz et al.

(10) Patent No.: US 12,079,810 B2
(45) Date of Patent: *Sep. 3, 2024

(54) METHOD FOR DETERMINING THE LIKELIHOOD FOR SOMEONE TO REMEMBER A PARTICULAR TRANSACTION

(71) Applicant: Capital One Services, LLC, McLean, VA (US)

(72) Inventors: Samuel Rapowitz, Roswell, GA (US); Viraj Chaudhary, Katy, TX (US); Zviad Aznaurashvili, Reston, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/372,866

(22) Filed: Sep. 26, 2023

(65) Prior Publication Data

US 2024/0013214 A1    Jan. 11, 2024

Related U.S. Application Data

(63) Continuation of application No. 17/232,376, filed on Apr. 16, 2021, now Pat. No. 11,810,112.

(51) Int. Cl.
*G06Q 20/00* (2012.01)
*G06N 5/04* (2023.01)
*G06N 20/00* (2019.01)
*G06Q 20/40* (2012.01)

(52) U.S. Cl.
CPC ............ *G06Q 20/401* (2013.01); *G06N 5/04* (2013.01); *G06N 20/00* (2019.01)

(58) Field of Classification Search
CPC ...... G06Q 20/40; G06Q 20/401; G06N 20/00; G06N 5/04
USPC .................................. 705/4, 35–45
See application file for complete search history.

(56) References Cited

U.S. PATENT DOCUMENTS

| | | |
|---|---|---|
| 8,255,318 B2 | 8/2012 | Royyuru |
| 9,171,306 B1 | 10/2015 | He et al. |
| 9,531,710 B2 | 12/2016 | Deutschmann et al. |
| 9,576,135 B1 | 2/2017 | Komandoor Elayavilli |

(Continued)

OTHER PUBLICATIONS

Aug. 26, 2022—(EP) Search Report—App No. 22168425.

*Primary Examiner* — Eric T Wong
*Assistant Examiner* — Mohammed H Mustafa
(74) *Attorney, Agent, or Firm* — Banner & Witcoff, Ltd.

(57) ABSTRACT

Aspects described herein may use a machine learning model to identify transactions likely to be remembered by a user and that may be used to generate challenge questions to authenticate the user. An individual may request an action related to a financial account. In response to the request, the machine learning model may determine a likelihood an authorized user of the financial account will remember one or more recent transactions. The likelihood of each candidate transaction may be compared to a predetermined threshold to determine a subset of recent transactions. Information relating to the subset of recent transactions may be used to generate one or more challenge questions to pose to the user. The user's responses to the challenge questions may be used to evaluate whether the user is the authorized user of the financial account or is a fraudster or imposter.

20 Claims, 6 Drawing Sheets

(56) References Cited

U.S. PATENT DOCUMENTS

| | | |
|---|---|---|
| 9,734,500 B2 | 8/2017 | Ghosh et al. |
| 9,819,662 B1 | 11/2017 | Fang et al. |
| 9,928,358 B2 | 3/2018 | Ghosh et al. |
| 10,755,281 B1 * | 8/2020 | Yip ................ G06Q 20/401 |
| 11,196,738 B2 * | 12/2021 | Brown ............. G06Q 20/3278 |
| 2006/0294390 A1 | 12/2006 | Navratil et al. |
| 2014/0214676 A1 | 7/2014 | Bukai |
| 2017/0154366 A1 | 6/2017 | Turgeman |
| 2018/0012227 A1 | 1/2018 | Tunnell et al. |
| 2018/0046785 A1 * | 2/2018 | Anderson ............ G06F 21/31 |
| 2018/0182044 A1 * | 6/2018 | Iannace ............. G06Q 40/12 |
| 2019/0318347 A1 * | 10/2019 | Aguiar .............. G06Q 40/02 |
| 2020/0097955 A1 * | 3/2020 | Gandhi ............. G06Q 20/381 |
| 2020/0167786 A1 * | 5/2020 | Kursun ............ G06Q 20/4016 |
| 2021/0065291 A1 * | 3/2021 | Gaivironsky ....... G06Q 20/405 |
| 2021/0279720 A1 * | 9/2021 | Maeng ............. G06Q 20/405 |

\* cited by examiner

METHOD FOR DETERMINING THE LIKELIHOOD FOR SOMEONE TO REMEMBER A PARTICULAR TRANSACTION

CROSS-REFERENCE TO RELATED APPLICATIONS

The present application is a continuation of U.S. Ser. No. 17/232,376, filed on Apr. 16, 2021, entitled "Method for Determining the Likelihood for Someone to Remember a Particular Transaction", which is hereby incorporated by reference in its entirety.

FIELD OF USE

Aspects of the disclosure relate generally to authenticating a user. More specifically, aspects of the disclosure provide techniques for using a machine learning model to identify financial transactions likely to be remembered by an authorized user of a financial account and that may be used to generate challenge questions to authenticate the user.

BACKGROUND

A user is often required to be authenticated in order to grant the user access to sensitive information or to perform a financial transaction. Conventional systems for authenticating a user may be circumvented by a sophisticated fraudster or imposter. For example, conventional systems may ask the user one or more challenge questions and may authorize the user if the user answers the challenge questions correctly. However, these conventional systems are typically only capable of generating simple challenge questions that relate to basic information of the user such as where the user went to high school. A sophisticated imposter may easily obtain answers to such simple challenge questions, thereby reducing the effectiveness of these conventional systems.

Aspects described herein may address these and other problems, and generally enable a user to be verified in a more reliable and robust manner, thereby reducing the likelihood that an imposter accesses and uses a financial account belonging to another individual.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Methods and systems disclosed herein may train a machine learning model using a variety of financial transactions to identify financial transactions that an authorized user of a financial account is likely to remember. The identified transactions may be used to generate robust challenge questions that may be used to authenticate an individual attempting to access or use the financial account. The individual may request an action related to a financial account to be performed that may require authentication of the individual. Machine learning, such as a trained machine learning model, may be used to review transaction data related to the financial account to select one or more recent transactions that are likely to be remembered by the actual owner or authorized user of the account. The selected transactions may then be used to generate challenge questions relating to specific details of the selected transactions. The individual may then be prompted to answer the one or more challenge questions. Based on the individual's responses, the individual may be determined to be authorized or not authorized.

Some aspects described herein may provide a computer-implemented method for authenticating a user. First data corresponding to a first plurality of transactions associated with a financial account of a user may be received. A plurality of transaction features may be defined based on the first data corresponding to the first plurality of transactions. The plurality of transaction features may include any type and number of transaction details, such as an indicator of a time of each transaction, an indicator of an amount of each transaction, an indicator of a type of each transaction, and an indicator of a source of funds for each transaction. An acknowledgement of at least one transaction feature of the plurality of transaction features for at least one transaction of the first plurality of transactions may be received from the user. A machine learning model may be trained to determine a likelihood the user will acknowledge a particular transaction based on: the first plurality of transactions; the plurality of transaction features; and the acknowledgement of the at least one transaction feature of the plurality of transaction features for the at least one transaction of the first plurality of transactions. At a later time, a request for authorization to perform a current financial transaction may be received from the financial account of the user. Second data indicative of a second plurality of transactions associated with the financial account of the user may be received. The machine learning model may be used to determine, based on the received second data, a value for each transaction of the second plurality of transactions. The determined value may indicate a likelihood the user remembers the transaction. The determined value for each transaction of the second plurality of transactions may be compared to a predetermined threshold. A subset of the second plurality of transactions may be determined based on the comparisons. The subset may include each transaction of the subset of the second plurality of transactions having a determined value that is greater than the predetermined threshold. One or more authorization questions may be generated based on transactional data of the determined subset of the second plurality of transactions. The one or more generated authorization questions may be provided to the user in response to the request for authorization to perform the current financial transaction. A determination whether to grant the request for authorization to perform the current financial transaction may be made based on one or more corresponding responses to the one or more generated authorization questions.

Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
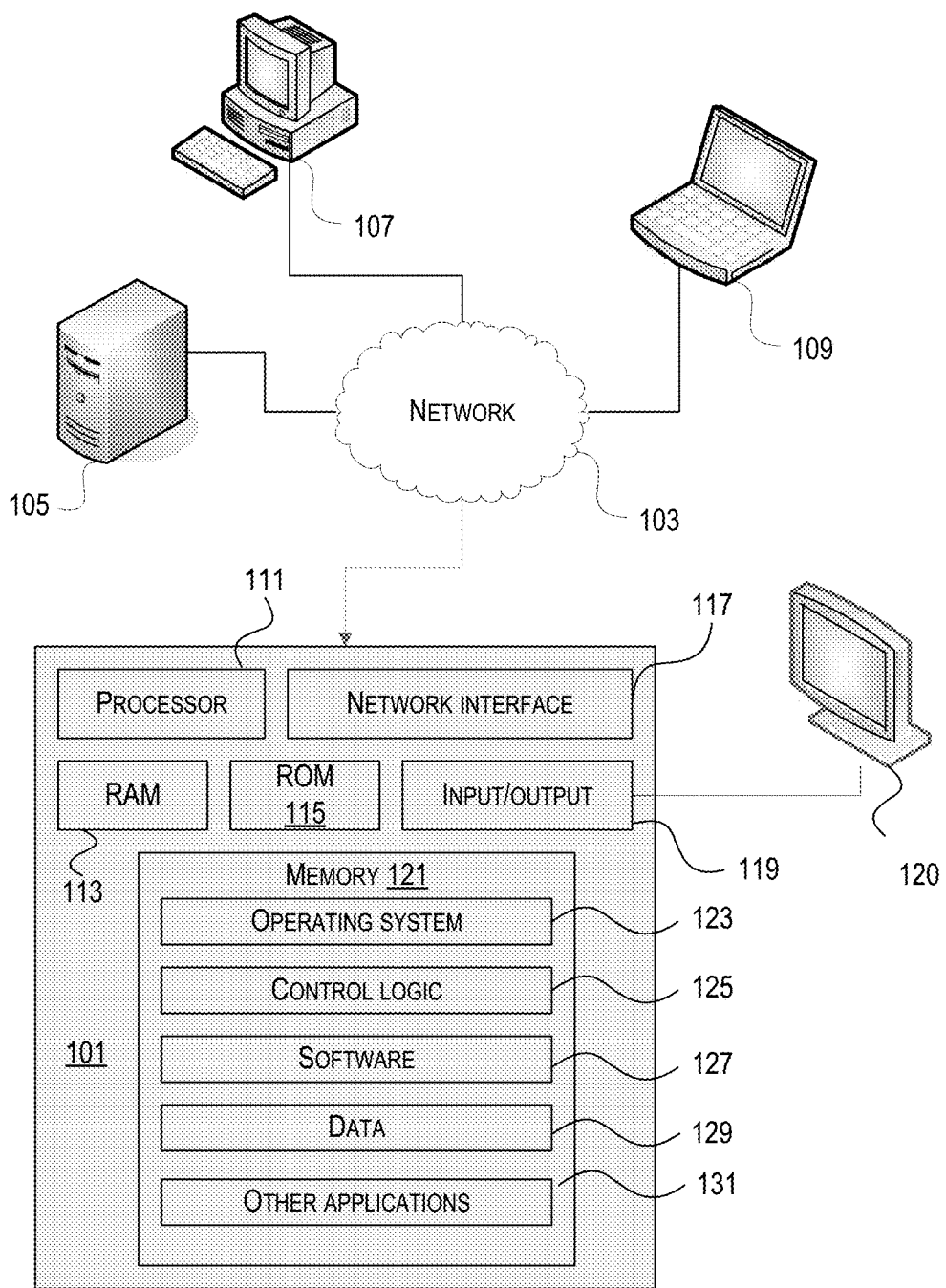
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for authenticating a user. An individual may request an action related to a financial account. The request may be a request to perform a transaction or to provide access to sensitive information. In response to the request, a machine learning model may determine a likelihood an authorized user of the financial account will remember one or more recent transactions. The machine learning model may have been previously trained using a variety of financial transactions to identify financial transactions that the authorized user of a financial account is likely to remember. The likelihood of each candidate transaction may subsequently be compared to a predetermined threshold to determine a subset of recent transactions. Information relating to the subset of recent transactions may be used to generate one or more challenge questions to pose to the user. The user's responses to the challenge questions may be used to evaluate whether the user is the authorized user of the financial account or is a fraudster or imposter. In this manner, an individual may be more reliability verified as the authorized user of the account, thereby mitigating the risk of an imposter conducting unauthorized transactions related to the financial account.

Aspects described herein improve the functioning of computers by improving the ability of computing devices to verify an identity of an individual, such as by improving the accuracy of computing-device implemented authentication methods. Conventional computing devices implementing conventional techniques for authenticating a user are susceptible to circumvention—for example, an unauthorized user may access the financial account of another user by obtaining information used to authenticated the user (e.g., a PIN, a date of birth, etc.). As such, these conventional computing devices and techniques leave users exposed to the possibility of an unauthorized user gaining access to the user's account. In turn, the actual account owner may be faced with significant burdens to recognize that the user's account was accessed without proper authorization and to then restore the account. By providing improved authorization techniques—for example, based on asking questions about certain financial transactions the actual owner of the account is likely to remember—an unauthorized user can be more accurately detected (e.g., as not being capable of correctly answering questions about recent transactions). Over time, the processes described herein can save processing time, network bandwidth, and other computing resources. Moreover, such improvement cannot be performed by a human being with the level of accuracy obtainable by computer-implemented techniques to ensure accurate authentication of the individual.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127, data 129, and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to various examples for authenticating a user.

Figure 2:
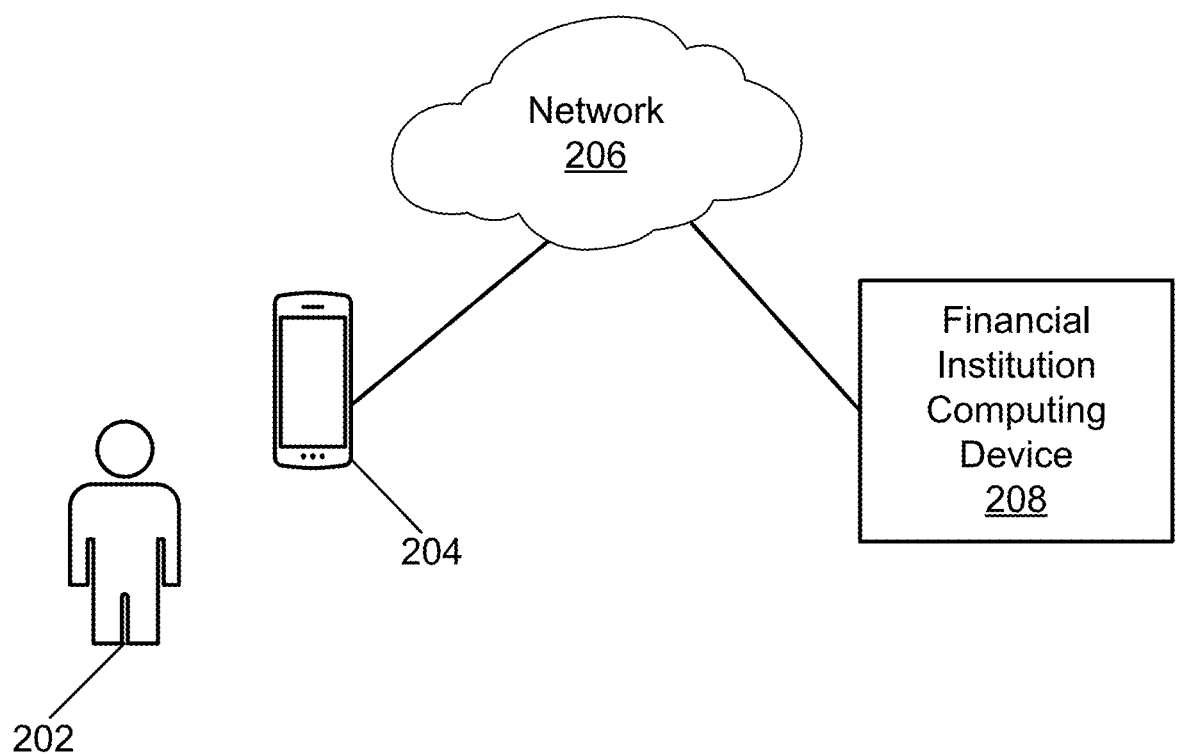
FIG. 2 illustrates a system authenticating a user in accordance with one or more aspects described herein.

FIG. 2 illustrates a system 200 for authenticating or authorizing an individual or a user in accordance with one or more aspects described herein. In various embodiments, the system 200 may be a knowledge-based step-up system. The system 200 may operate to verify an identity of a user (e.g., authenticate a user). In various embodiments, a user may attempt to perform a transaction or to access secure or sensitive information (e.g., customer data) associated with a financial account. The system 200 may determine whether the user is the same individual associated with the financial account and therefore authorized to perform a requested transaction or to obtain access to secure information.

In various embodiments, if the system 200 determines the user is authorized, then access to secure data may be provided or authorization to perform a requested transaction may be provided. In contrast, if the system 200 determines the user is not authorized, then access to the secure data may be not be provided or authorization to perform a requested transaction may not be provided. In various embodiments, if the system 200 determines the user is not authorized, the user may be determined to be a fraudster.

In various embodiments, the system 200 may attempt to verify an identity of a user based on questions about prior transactions associated with a financial account. The system 200 may operate to determine which transactions out of a set of prior transaction to designate for inquiry. In various embodiments, the system 200 may determine a likelihood that a particular user may remember a particular transaction so as to identify one or more transactions to use for verification of the user. Once a particular transaction is determined, the system 200 may operate to develop particular questions related to the determined transaction to pose to the user. The system 200 may verify the user based on the user's response to the posed questions regarding the transaction.

In various embodiments, the system 200 may use behavioral biometric techniques for verifying the user based on responses to posed questions about certain transactions. In various embodiments, the system 200 may elicit audible or verbal responses from the user. Behavioral biometric data may be extracted from the audible responses of the user and may be used to verify the user as described herein. Behavioral biometric data may also be extracted based on digital behavior data such as a user's swipe patterns or touch response when interacting with a user interface (e.g., in response to posed questions).

As shown in FIG. 2, the system 200 may include a user 202, a user computing device 204, a network 206, and a financial institution computing device 208. The user computing device 204 may be any type of computing device including any computing device depicted and described in relation to FIG. 1. In various embodiments, the user computing device 204 may be, for example, a smartphone, a laptop, or a tablet. In various embodiments, the user computing device 204 may be a portable wireless device. Reference is made herein to the system 200 for convenience only as it is to be understood that the user 202 is an actor interacting with the other components depicted in FIG. 2. Accordingly, in various embodiments, the system 200 may not include the user 202.

The user computing device 204 may be associated with the user 202. The user 202 may use the user computing device 204 to access secure or sensitive information associated with a financial account. The user 202 may use the user computing device 204 to request performance of a transaction associated with the financial account. The user 202 may be or may not be authorized to access sensitive information associated with a financial account or to request performance of a transaction associated with the financial account. For example, the user 202 may be or may not be the true-named-person (e.g., the owner or authorized user) of the financial account. As further described herein, the system 200 operates to determine whether or not the user 202 is the individual the user 202 may claim to be and/or whether or not the user 202 is authorized to access sensitive information associated with a particular financial account or to perform a transaction involving the financial account.

The network 206 may communicatively couple the user computing device 204 with the financial computing device 208. The network 206 may be any type of communications and/or computer network. The network 206 may include any type of communication mediums and/or may be based on any type of communication standards or protocols. The network 206 may be the same or similar to the network 103 FIG. 1. The network 206 enables data or other information to be shared between the user computing device 204 and the financial computing device 208.

The financial institution computing device 208 may be any type of computing device including any computing device depicted and described in relation to FIG. 1. In various embodiments, the financial institution computing device 208 may be associated with a financial institution. In various embodiments, the financial institution computing device 208 may represent one or more computing devices and/or a computer network associated with the financial institution. In various embodiments, the financial institution computing device 208 may include one or more computers, servers, and/or databases. The financial institution may be a bank, credit union, credit card company, or any other type of financial institution that may provide one or more financial accounts to an individual.

In various embodiments, the user 202 associated with the user computing device 204 may have one or more financial accounts with the financial institution associated with the financial computing device 208. In various embodiments, the user 202 associated with the user computing device 204 may have a checking account, a savings account, a line of credit, and/or a credit card account provided through the financial institution associated with the financial institution computing device 208. In general, the user 202 associated with the user computing device 204 may have any type of financial account with the financial institution associated with the financial institution computing device 204.

In various embodiments, the user 202 may use the user computing device 204 to attempt to conduct a financial transaction using (e.g., funded by) an account maintained by the financial institution computing device 204 and/or the user 202 may use the user computing device 204 to attempt to access sensitive or secure information related to an account maintained by the financial institution computing device 204. Any such attempt by the user 202 may trigger the system 200 to verify the user 202. For example, any such attempt by the user 202 may cause the system 200 to operate to attempt to authenticate the identity of the user 202 to ensure the user 202 is indeed the individual associated with the financial account and therefore authorized to perform the requested transaction or to access the requested information.

In various embodiments, the financial institution computing device 208 may store information related to various financial accounts (e.g., data or other information related to various transactions for each financial account). In various embodiments, the system 200 may operate to determine one or more transactions related to a particular financial account that the user 202 may be attempting to access. The one or more transactions may be transactions that an individual associated with the financial account is likely to remember. Accordingly, the system 200 may further operate to determine a likelihood an individual associated with the financial account is likely to remember a particular transaction. The system 200 may determine one or more particular transactions that are likely to be remembers and may designate such transactions for use in authenticating the user 202. In various embodiments, data related to the determined transactions may be used to generate authentication or challenge questions to be presented to the user 202.

In various embodiments, after determining the one or more transactions related to a particular financial account that the user 202 may be attempting to access, the system 200 may operate to generate one or more questions related to the one or more transactions. The questions may be provided to the user 202. The user 202 may be prompted to answer the questions. In various embodiments, the user 202 may be prompted to provide verbal or audible answers to the questions. In various embodiments, the user 202 may be prompted to provide answers by touching or swiping a user interface provided by the user computing device 202. The system 200 may then use the user's audible answers or physical manipulation of a user interface responses to authenticate or to not authenticate the user 202. In various embodiments, behavioral biometric information or characteristics of the answers of the user 202 may be analyzed to confirm whether or not the user 202 is indeed the owner or authorized user of the financial account to which the user 202 is requesting access. Accordingly, the system 200 may further operate to implement techniques to verify an individual based on behavioral biometric data.

The system 200 provides numerous advantages over conventional systems for authenticating a user. Conventional systems often rely on two-factor authentication techniques that may be circumvented by fraudsters. The system 200 may rely on step-up or active authentication techniques that require a user to answer questions based on the knowledge of the user—for example, specific questions about specific transactions. Further, the system 200 may extract behavioral biometric data from any answers provided by a user to further assess the risk of granting authorization to the user. Conventional systems may rely on a generic recording of the user to verify that the voice of the user matches data stored for the owner of a financial account. Such systems may be circumvented by fraudsters given the passive nature of such authentication techniques. In contrast, the system 200 may extract meaningful and useful behavioral biometric data based on a user's answers to questions that the user cannot prepare for ahead of time.

Discussion will now turn to functional descriptions of the operations performed by one or more components for the system 200 for authenticating a user.

Figure 3:
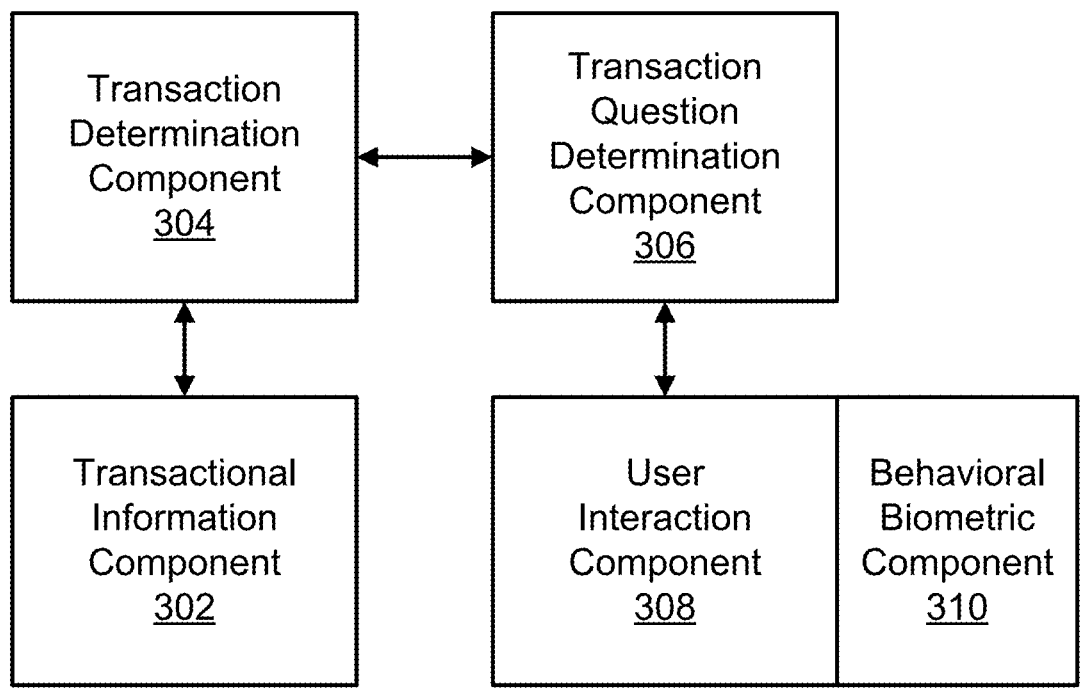
FIG. 3 illustrates a system for verifying an identity of a user based on financial tarnation information in accordance with one or more aspects described herein.

FIG. 3 illustrates a system 300 for verifying an identity of a user based on financial transaction information in accordance with one or more aspects described herein. The system 300 may also be considered as operating to authenticate a user or an identity of a user. In various embodiments, the system 300 may include various functional components as shown to identify one or more transactions, generate one or more question related to each transaction, and to determine an identity of a user based on responses to the generated questions. One or more of the components depicted in FIG. 3 may be included or may be implemented by the financial computing device 208 of FIG. 2.

As shown in FIG. 3, the system 300 may include a transactional information component 302, a transaction determination component 304, a transaction question generation component 306, and a user interaction component 308. Each depicted component may be implemented by one or more computing devices or may be implemented with the same computing device or system. For example, one or more components of the system 300 may be implemented by the financial institution computing device 208 of FIG. 2.

In various embodiments, the transactional information component 302 may store information or data related to any number of transactions related to one or more financial accounts of an individual. As an example, an individual may have a checking account with a financial institution. The transactional information component 302 may store a variety of information related to any transaction involving the checking account including, for example, a date of the transaction, a time of the transaction, and/or an amount of the transaction. The transactional information component 302 may also store information such as a merchant category code (MCC), a type of product or service involved in the transaction, and/or a particular product purchased (e.g., stock-keeping unit (SKU) level data associated with a transaction). In various embodiments, the transactional information component 302 may operate to convert merchant codes associated with a transaction to a complete company or business name an individual may be more familiar with (e.g., as opposed to the sometimes cryptic merchant codes provided in basic transaction identification information).

In various embodiments, the transactional information component 302 may identify a particular individual associated with a particular individual. For example, two or more people may share a financial account. A first user may be the owner or primary user of the account and a second user may be an authorized user of the account. In various embodiments, the transactional information component 302 may distinguish transactions conducted by the first user and the second user. In various embodiments, the transactional information component 302 may receive or may access location data or information for each user of a financial account based on, for example, a device used by each user to conduct transactions. In various embodiments, the transactional information component 302 may use this location information to distinguish the first user and the second user so as to distinguish which particular transactions are conducted by the first user and which particular transactions are conducted by the second user. In various embodiments, identification information associated with devices used by each user to conduct transactions may be used to distinguish users and therefore which particular transactions are conducted by the first user and the second user.

In various embodiments, the transaction determination component 304 may use information stored by the transactional information component 302 to determine one or more transactions to use as a basis for verification of an individual. In various embodiments, an individual may request performance of a transaction that may require authorization (e.g., verification that the user requesting the transaction is indeed associated with the financial account and is authorized to request such performance).

In various embodiments, the transaction determination component 304 may implement a machine learning (ML) model to determine a likelihood an individual remembers a particular transaction. Any ML model implemented by the transaction determination component 304 may consider any type of data or other information associated with the transaction (e.g., that may be inputs to the ML model) such as, for example:
the date of a transaction;
the time of day of the transaction;
how much time has passed since the transaction (e.g., how recent);
the amount of the transaction;
whether the transaction occurred online or in person at a store;
how many other transactions were conducted on the same day;
the product or service purchased;
whether the transaction was conducted with a card on file or a default card;
whether the merchant was large or small;
how big a tip was left;
whether the transaction was declined;
whether the transaction involved a return;
an MCC category code of the merchant; and/or
SKU level data.

As an output of the ML model, a likelihood an individual remembers a particular transaction may be determined (e.g., a likelihood of remembrance). The determined likelihood may then be used by the system 300 to determine if questions surrounding the transaction should be generated to verify the individual. In various embodiments, determined likelihoods may be determined for a number of transactions. Transactions with an associated determined likelihood that exceeds a predetermined threshold may then be identified for use in the generation of questions to verify the individual. The determined likelihood may be expressed as a numerical value or a percentage.

In various embodiments, ML-based techniques and/or an ML model may be used to enable determination of a likelihood that an individual may remember a particular transaction. In various embodiments, first data corresponding to a first plurality of transactions associated with a financial account of a user may be received by the system 300. A plurality of transaction features may be defined based on the first data corresponding to the first plurality of transactions. The plurality of transaction features may be used to train an ML model to recognize features of a transaction a user is likely to remember. In turn, a specific transaction may be identified. The plurality of transaction features may include any number and any type of characteristic of a transaction. In various embodiments, the plurality of transaction features may include various indicators such as, for example, an indicator of a time of a transaction, an indicator of an amount of a transaction, an indicator of a type of a transaction, and an indicator of a source of funds for a transaction.

In various embodiments, the ML model may be trained based on features one or more users identify as recognizable or memorable for one or more transactions (e.g., training data). In various embodiments, the ML model may be trained based on transaction data for a particular user, specification of transactions identified by the user, and/or features of transactions identified by the user as memorable. Based on training the ML model, the ML model may be capable of recognizing similar memorable features of other transaction data of the user (e.g., non-training data). The ML model may then identify transactions likely to be remembered by the user based on transaction features by which the ML model may be trained.

In various embodiments, second data indicative of a second plurality of transactions associated with the financial account of the user may be received by the system 300. The ML model (e.g., after training) may determine a value for each transaction of the second plurality of transactions indicating a likelihood the user remembers the transaction, based on the received second data. The value determined for each transaction may be or may indicate or represent a likelihood the user remembers the transaction. The second plurality of transactions may involve transactions that were recently conducted and/or that were performed within a certain period of time form an action by a user that triggered a need to perform authentication of the user.

In various embodiments, the transaction determination component 304 may compare the determined value for each transaction of the second plurality of transactions to a predetermined threshold. The transaction determination component 304 may then determine a subset of the second plurality of transactions based on the comparison to the predetermined threshold. As an example, the subset may include each transaction of the second plurality of transactions having a determined value that satisfies the predetermined threshold (e.g., meets or exceeds the predetermined threshold).

The transaction determination component 304 may then provide information identifying the subset of transactions to the transaction question generation component 306. The transaction question generation component 306 may develop one or more questions related to each transaction of the identified subset. The transaction question generation component 306 may also develop answers to each question. In various embodiments, the transaction questions developed by the transaction question generation component 306 may be step-up authentication questions. In various embodiments, the transaction questions developed by the transaction question generation component 306 may be considered to be authorization or challenge questions. The questions generated by the transaction question generation component 306 may be designed to elicit type of response from a user. For example, the questions generated by the transaction question generation component 306 may be designed to prompt the user for a verbal or audible response that may be used by the system 300 to authenticate the user. As another example, the questions generated by the transaction question generation component 306 may be designed to prompt the user to provide certain touch inputs to a user interface device (e.g., certain touchscreen swipes, swipe patterns, or touches) that may be used by the system 300 to authenticate the user. The questions may ask the user about any detail of a recent transaction such as a name of a store, an amount of a transaction, what was purchased, the type of transaction, how much of a tip was left, what card was used for the transaction, etc.

In various embodiments, the user interaction component 308 may receive the authorization questions from the transaction question generation component 306. The user interaction component 308 may present the authorization questions to the user (e.g., the user 202). The authorization questions may be presented to the user in any manner using any type of device (e.g., using the user computing device 204). In various embodiments, the user interaction component 308 may request or elicit verbal or audible answers from the user for each posed or presented authorization question. In various embodiments, the user interaction component 308 may present the authorization questions to the user in response to the user requesting access to sensitive or confidential information or based on the user requesting authorization to a perform a financial transaction. In various embodiments, the user interaction component 308 may determine whether to grant the user access to the information or to grant the request for authorization to perform the financial transaction based on responses to the authorization questions. As an example, a correct answer to an authorization question may cause the user interaction component 308 to grant a request for authorization to perform the financial transaction.

In various embodiments, user interaction component 308 may include a behavioral biometric component 310. The behavioral biometric component 310 may improve a process for verifying a user based on behavioral biometric data. In various embodiments, the behavioral biometric component 310 may gather behavioral biometric data associated with a user when the user answers questions about a past transaction (e.g., based on one or more of the authorization questions developed by the transaction question generation component 306). Behavioral biometric data that may be gathered or collected when a user answers a questions may include any of the following:

voice tone;
voice cadence;
dialect of the user;
slang used by the user;
pauses or hesitations in an answer by a user;
how long it takes to answer a questions; and/or
pronunciations by the user.

In various embodiments, the behavioral biometric data collected by the behavioral biometric component 310 may be based on verbal answers provided by the user. Further, the behavioral biometric data collected by the behavioral biometric component 310 may be based on step-up authentication questions that are based on information available or presented to the user (e.g., information regarding the user's financial account that the user may be logged into). The behavioral biometric data may further inform the risk level of authorizing the user to perform a certain action or to grant the user with access to certain information.

In various embodiments, behavioral biometric data may be collected based on the user's physical (e.g., touch) interactions with a user interface (e.g., swiping, swipe patterns, touchscreen inputs). Accordingly, the system 200 is capable of extracting behavioral biometric data from verbal responses of the user, touch input response from the user, or any combination thereof.

In various embodiments, behavioral biometric data collected by the behavioral biometric component 310 may be compared to prior behavioral biometric data collected for a particular user. The behavioral biometric component 310 may determine a likelihood that a user is indeed an authorized user (e.g., an individual the user alleges to be with regards to a particular financial account or transaction) based on comparing the newly collected behavioral biometric data to the any prior behavioral biometric data collected for the user. In various embodiments, the collected behavioral biometric data may be compared to known fraudsters to determine if the user is a known fraudster.

In various embodiments, prior collected behavioral biometric data for a user may be used to generate a model of the user. Any new behavioral biometric data gathered for a user (e.g., in response to one or more authorization questions generated by the transaction question generation component 306 and provided to the user by the user interaction component 308) may compared to the model for the user. A likelihood that the user is an authorized user may be determined based on the comparison. In various embodiments, a likelihood that the model for the user fits the newly collected behavioral biometric data may be determined and the user may be authorized based on a value of the likelihood exceeding a predetermined threshold. In various embodiment, the newly collected behavioral biometric data may be used to further refine the model for the user (e.g., after determining the user is the authorized user). The predetermined threshold may be set to any value and may be adjusted to increase or decrease the certainty of a result (e.g., a value exceeding a relatively higher threshold may be viewed as indicating a result associated with the value being more certain) and/or to reduce a possibility of a false alarm.

In various embodiments ML-based techniques and/or an ML model may be used to enable determination of a likelihood that a user is an authorized user based on behavioral biometric data. In various embodiments, an ML model may be trained to recognize characteristics of a user's speech or speech patterns. The ML model may then be used to determine if collected behavioral biometric data is of a certain individual or not such that a determination whether to authorize an individual may be determined. A second ML model may also be trained to recognize characteristics of a user's touch inputs or responses. The second ML model may then be used to determine if collected behavioral biometric data is of a certain individual. In various embodiments, both the first and second ML models may be used to authenticate a user.

In various embodiments, voice data corresponding to a known user may be received by the system 300. The voice data may be voice data recorded from the known user—for example, the user known to be the true owner or authorized user of a particular financial account. A plurality of characteristics of the user based on the voice data corresponding to the user may then be defined. The ML model may be trained to recognize the user based on one or more characteristics of the plurality of characteristics of the user.

After training the ML model, at a later time, a request to perform a financial transaction may be received. The system 300 may be triggered to authenticate an individual based on the request to perform the financial transaction. The request may be associated with the financial account of the known user. In conjunction with the transactional information component 302, the transaction determination component 304, and/or the transaction question generation component 306, one or more challenge or authentication questions based on one or more prior financial transactions involving the financial account (e.g., and the actual owner of the account) may be generated. Further, the authentication questions may be provided to the user and one or more audible responses to each of the one or more authentication questions may be received. In various embodiment, the ML model may determine a likelihood that the known user provided the one or more audible responses (e.g., as opposed to an unknown user or another user posing as the known user associated with the financial account). The ML model may determine the likelihood based on the one or more received audible responses.

In various embodiments, the determined likelihood may be compared to a predetermined threshold. The user interaction component 308 and/or any portion of the system 300 may then determine whether to grant the request for authorization to perform the financial transaction based on the determined likelihood satisfying the predetermined threshold (e.g., by meeting or exceeding the threshold). The user interaction component 308 and/or any portion of the system 300 may deny the request for authorization to perform the financial transaction based on the determined likelihood not satisfying (e.g., not meeting or exceeding) the predetermined threshold.

In various embodiments, the user interaction component 308 may present one or more challenge questions to an individual that may elicit a touch input response from the user. In various embodiments, an indicator of a touch input to a device associated with the request for authorization to perform a financial transaction may be received. The second ML model described above may, based on the indicator of the touch input to the device associated with the request for authorization to perform the current financial transaction, determine a likelihood that the user is authorized. For example, the second ML model may develop a new likelihood metric and/or may supplement the likelihood value determined by the first ML model. Additionally, and/or alternatively, the user interaction component 308 may receive video input of the user responding to a challenge question which may be used for authentication. In general, any combination of audio, video, or physical touch-based input by be received by the user interaction component 308 and used for authentication as described herein.

In various embodiments, the system 300 may use an ML model and/or any ML techniques for providing the functionality described herein. In various embodiments, any of the ML models described herein may support a vector machine, logistic regression, random forest, or an equivalent thereof. Additionally, or alternatively, any of the machine learning models described herein may be a convolutional neural network, a recurrent neural network, a recursive neural network, a long short-term memory (LSTM), a gated recurrent unit (GRU), an unsupervised pre-trained network, a space invariant artificial neural network, or any equivalent thereof. In some embodiments, one or more of the machine learning models described herein may be an existing machine learning model. In further embodiments, one or more of the machine learning models described herein may be a proprietary model. Alternatively, one or more of the machine learning models described herein may be a modified existing machine learning model such that one or more of the machine learning models described herein becomes proprietary.

The system 300 provides improved techniques for authenticating an individual over conventional systems. Conventional systems typically may ask authorization questions to a user that are not based on prior transactions of the individual. As such, fraudsters may more easily circumvent such questions. For example, authentication questions may be based on basic user information such as the user's address, social security number, or other information that a fraudsters may have already obtained, particularly if the fraudster has already obtained access to another user's financial account. The system 300 enhances authentication techniques by determining whether to grant authorization based on behavioral biometric data collected when an individual answers challenge questions. The challenge questions, which may be directed to specific details of various transactions, forces the individual to step-up to each questions as the individual is not aware of what question is to be asked. Further, the response of the user cannot be pre-recorded and circumvented as easily. Additionally, behavioral biometric data which is typically not collected by authentication systems may be sued to further assess the risk that an individual is not who they allege to be (e.g., based on the individual's request to perform a financial transaction).

The system 300 and/or any component thereof may operate as disclosed herein to provide or may be considered to be a biometrics-infused dynamic knowledge-based authentication tool or application. The tool or application provided by the system 300 and/or any component thereof may be used to authenticate an individual and/or to verify an identity of an individual. The tool or application provided by the system 300 and/or any component thereof is based on information known to the individual being authenticated (e.g., based on that individual's knowledge of recent transactions). The tool or application provided by the system 300 and/or any component thereof authenticates the individual based on behavioral biometric data collected from the individual and so may be considered to be biometrics-infused.

Figure 4:
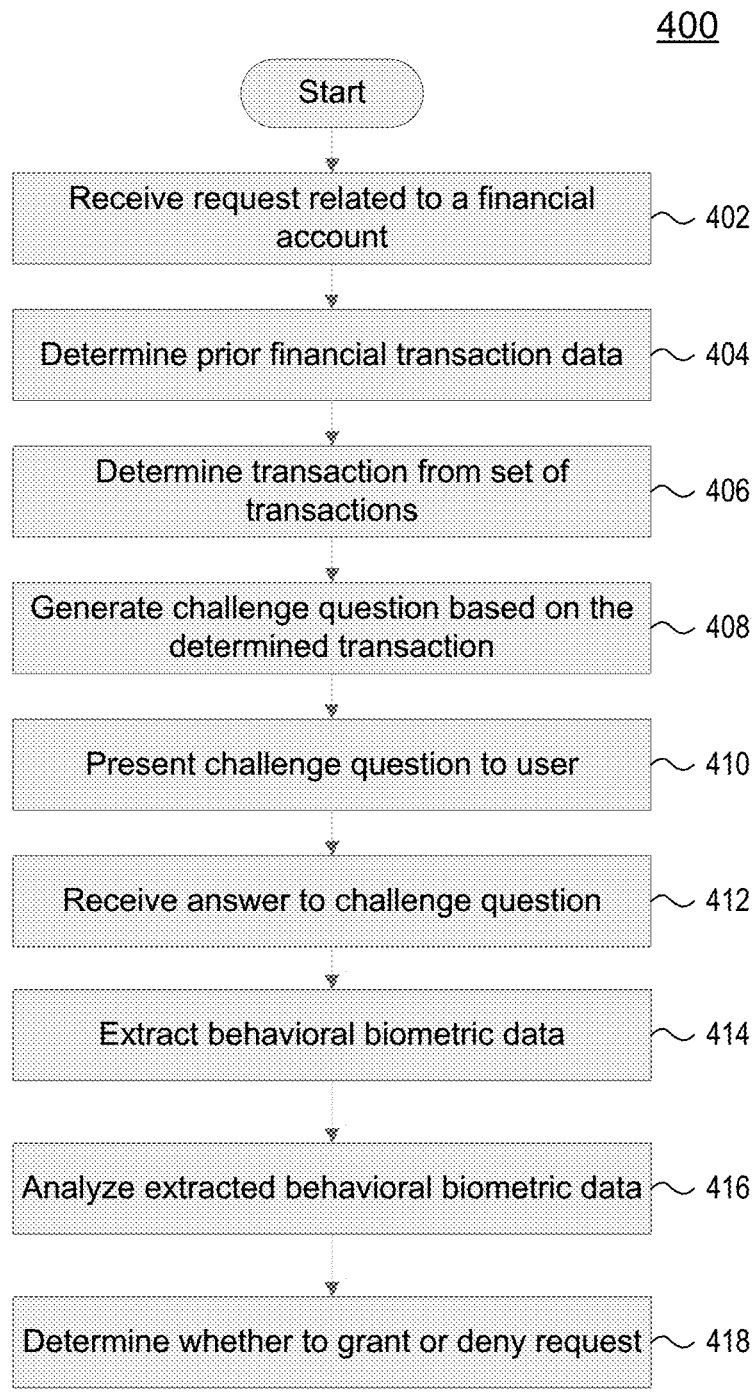
FIG. 4 depicts a flowchart for a method for authenticating a user based on behavioral biometric data for the user determined by the user answering questions related to prior transaction the user is likely to remember in accordance with one or more aspects described herein.

Discussion will now turn to FIG. 4 which illustrates an example method 400 for authenticating a user based on behavioral biometric data for the user determined by the user answering questions related to prior transaction the user is likely to remember in accordance with one or more aspects described herein. Method 400 may be implemented by a suitable computing system and/or any combination of computing systems or devices, as described herein. For example, method 400 may be implemented in any suitable computing environment by a computing device and/or combination of computing devices, such as computing devices 101, 105, 107, and 109 of FIG. 1 and/or by any one or more of the components depicted in any of FIGS. 1-3. Method 400 may be implemented in suitable program instructions, such as in software 127, and may operate on data, such as data 129. Method 400 may be implemented by the system 300 and/or any component thereof.

At step 402, a request to perform an action may be received. The action may require authorization prior to being performed. The action may be related to a financial account. As an example, the action may relate to requesting access to sensitive or confidential information that is to be provided only to the authorized user of the financial account. As another example, the action may relate to requesting performance of a transaction involving the financial account. In various embodiments, the request may be received from a user computing device controlled by an individual. The individual may or may not be the authorized user of the financial account subject to the request. The individual may be logged into the financial account. The method 400 may be used to determine (e.g., based on a determined likelihood) whether the individual that issued the request is indeed the user authorized to be granted the request relating to the financial account.

At 404, prior financial transactions related to the financial account may be determined. The prior financial transactions may cover any period of time. In various embodiments, the prior financial transactions may be relatively recent transactions such as transactions conducted within the last month. As an example, the financial account may be a checking account and the prior financial transactions may be all transactions involving the checking account within the last month. The period of time may be measured from a time the request from step 402 is made and/or received.

At 406, at least one transaction from the prior financial transactions may be determined or selected. The transaction may be selected as a transaction the authorized user of the financial account is likely to remember. In various embodiments, the ML model described in relation to FIG. 3 may be used to select a transaction the authorized user of the financial account is likely to remember. The transaction may be determined from a set of available or candidate transactions that may have occurred within a relevant period of time.

At 408, one or more questions relating to the at least one transaction determined at step 406 may be generated. The questions may relate to one or more details or features of the determined transaction. As an example, the questions may include questions asking the user to pronounce the name of a particular merchant associated with the transaction, asking the user what type of item was purchased with the transaction, or asking the user whether the transaction involved a purchase or a return of an item.

At 410, the one or more questions may be provided to the user. The questions may each be presented so as to indicate that the user is to provide an audible answer. In various embodiments, an answer to a question may request a touch input to a user device. Any number of questions may be asked and any type of response (e.g., verbal and/or touch input) may be requested. The questions may be presented on a user computing device associated with the user.

At 412, audible answers to the questions may be received. Voice data corresponding to the audible answers may be received and stored. As such, a recording of the user's responses may occur at step 412. Touch input responses to questions to certain questions may also be received. In general, one or more answers or responses may be requested and the responses may be verbal or touch input or any combination thereof. Data indicative of any response may be received and stored.

At 414, behavioral biometric data relating to the user's audible answers may be extracted. The behavioral biometric data may include any data relating to a user's speech or speech patterns as described herein such as, for example, a voice tone of the user, a dialect of the user, and/or pronunciations by the user. In various embodiments, behavioral biometric data relating to any touch input response may also be received and extracted from a response to a challenge question. In general, behavioral biometric data from any type of response may be received or extracted including verbal response, touch based responses, or any combination thereof.

At 416, the extracted biometric data may be used to determine if the user that provided the responses is the individual authorized for the financial account. In various embodiments, the behavioral biometric ML model described in relation to FIG. 3 may be used to determine a likelihood that the user that issued the request that was received in step 402 is the authorized user of the financial account that is related to the request. In various embodiments, a behavioral biometric model of the authorized user of the account may be compared to the extracted biometric data to determine the likelihood that the user that issued the request that was received in step 402 is the authorized user of the financial account that is related to the request. In various embodiments, the extracted biometric data may be compared to known behavioral biometric data of known fraudsters. Overall, via step 416, a risk that the individual is not the true-named-person on the account (e.g., the owner or authorized user) may be determined.

Analyze

At 418, a determination whether to grant or deny the request may be determined based on the likelihood determined at step 416. The likelihood determined at step 416 may be compared to a threshold. If the likelihood satisfies the threshold (e.g., meets or exceeds it), then the request may be granted. If the likelihood does not satisfy the threshold (e.g., does not meet or exceed it), then the request may be not be granted and may be denied. Under such a scenario, the user issuing the request may be determined to be a fraudster and/or determined not to be the user authorized for the financial account. The financial account may then be locked to prevent further fraudulent activity in response to such a determination. Other steps may also be implemented to protect the financial account of the authorized user and/or to identify the fraudster.

An example using the systems 200 and/or 300 and/or the method 400 will now be presented for illustration of the improved authentication techniques provided herein. In the example, a first user may be associated with a financial account of a financial institution. The financial institution may be a bank. The financial account may be a checking account. The first user may be the owner of the checking account. A second user may also be associated with the account. The second user may be an authorized user of the account but not the owner of the account. As such, both the first and second users may use the checking account to conduct transactions. Accordingly, transaction data associated with the checking account may include data relating to first transactions conducted by the first user and data relating to second transactions conducted by the second user. The first and second user may each have separate access to the checking account through online or web-based access. For example, the first user may use first credentials to log into the checking account and the second user may use second credentials to log into the checking account through an online platform.

Continuing with the example, at some point in time, an individual may log into the checking account. The individual may have logged into the checking account using the first credentials of the first user. The individual may be the first user or may not be the first user. The individual may be a fraudster that circumvented log in authorization techniques associated with the checking account or a fraudster that obtained the first user's first credentials. Under any scenario, some individual has logged into the checking account and appears to the first user. The individual then requests that a large sum of funds from the checking account be transferred to another checking account associated with another financial institution. This transaction may be flagged as requiring further verification of the individual (e.g., either based on the sum of the funds or the based on the request to transfer funds to an unknown account).

After receiving the request and after the determination that further authentication may be needed, recent transaction data from the checking account may be obtained or accessed. The transaction data may include any details, features, or characteristics of any transaction conducted using the checking account over any period of time. As an example, the transaction data may include transactions conducted using the checking account within the past two months. The transaction data may be culled to remove the transaction data related to transactions conducted by the second user. Accordingly, transaction data specific to the first user may be identified and selected.

The recent transaction data of the first user may then be evaluated to identify one or transactions that the first user is likely to remember. An ML model, such as the ML model described herein, may be used to identify the one or more transactions. After identifying the one or more transactions likely to be remembered by the user, one or more challenge questions for each transaction may be generated. The questions may involve any detail or feature of any of the identified transactions. As an example, a first identified transaction may be a transaction by the first user at a restaurant. The transaction data may indicate that the name of the restaurant is "Quinoa Time!". The restaurant may be a restaurant that the first user visits frequently. Further, it may be determined that the first user commonly mispronounces the name of the restaurant. Accordingly, to verify the individual, a generated question may ask the individual to announce the name of the restaurant where a certain charge on a certain day was made. To do so, a challenge question to the individual may then be presented. The challenge question may be displayed on a computing device being used by the individual. The challenge question may be displayed as: "What restaurant did you eat at yesterday for lunch." The individual—who may be logged into the checking account at the time of being prompted to answer the question—may see a list of recent transactions. The individual may see that the name of the restaurant is "Quinoa Time!". The individual, in response to being asked to provide a verbal answer, may respond with the name of the restaurant.

The verbal answer of the individual may be received and stored. Behavioral biometric data of the user's answer may be extracted. Pertinent information such as a fairly lengthy delay between the question and the response may be noted as well as that the individual properly pronounced the name of the restaurant, whereas the first user routinely mispronounces the name of the restaurant. Extracted behavioral biometric data from the individual's answer may be used by the behavioral biometric ML model described herein to determine a likelihood that the individual is the first user. Alternatively, the extracted behavioral biometric data from the individual's answer may be compared to a specific model of the first user's speech and/or speech habits. Under any case, a determination of a likelihood that the individual is the first user is made. The determined likelihood may then be compared to a predetermined threshold.

The predetermined threshold may be set at 50% and a determined likelihood that exceeds the predetermined threshold may be required for authorization. The determined likelihood may be only 20% based on the individual's verbal responses. Accordingly, it may be determined that the individual is not the first user such that the requested transaction should not be approved. Further, steps may be taken to protect the checking account by shutting down online access and alerting the first or second user of a likely security breach of the checking account. This example indicates the robustness of the authentication techniques of the systems described herein.

Figure 5:
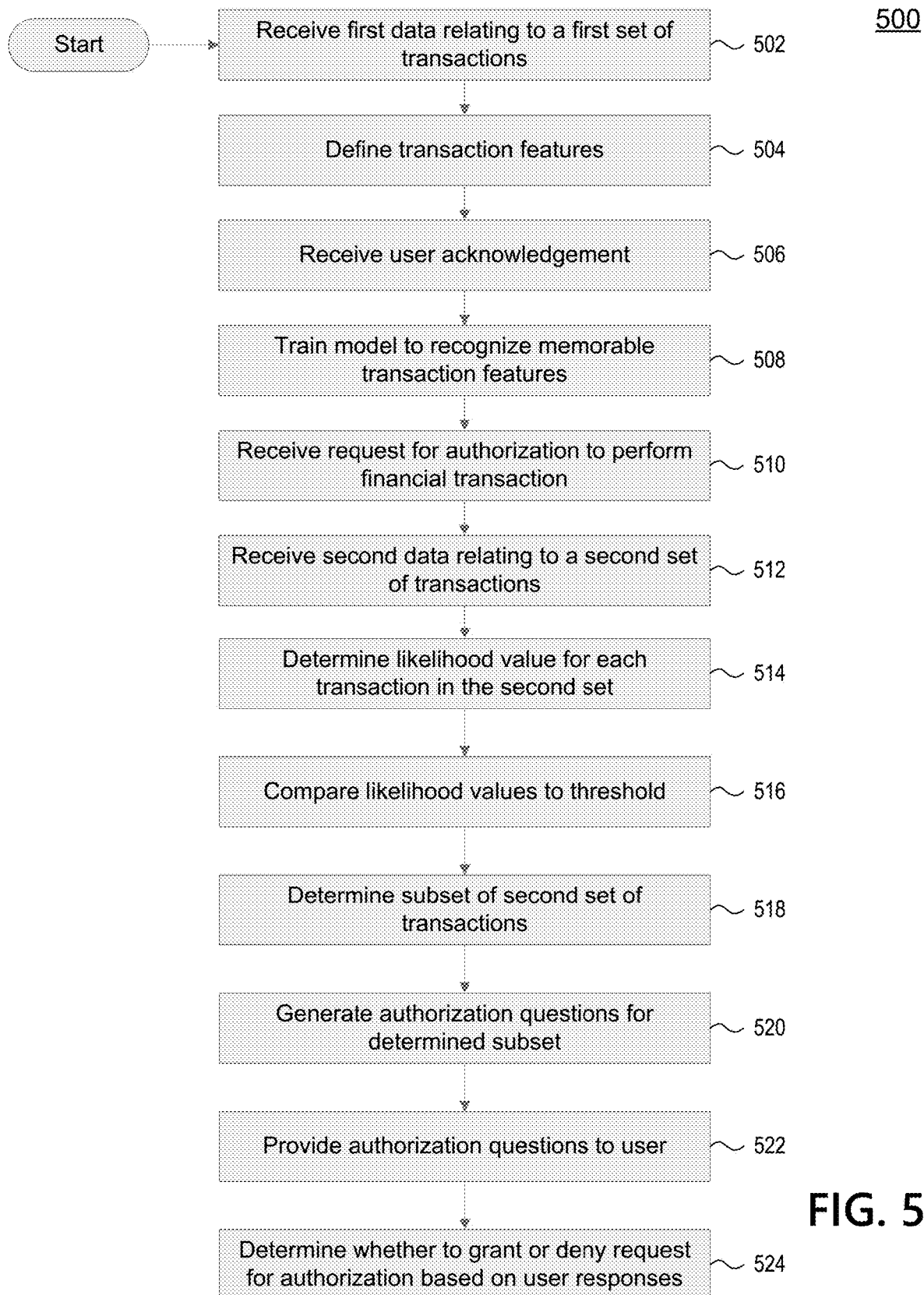
FIG. 5 depicts a flowchart for a first method for authenticating a user in accordance with one or more aspects described herein.

Discussion will now to turn to FIG. 5 which illustrates an example method 500 for authenticating a user in accordance with one or more aspects described herein. Method 500 may authenticate a user based on determining a likelihood the user remembers a particular transaction. The particular transaction may relate to a financial account that the user may claim to be an authorized user of (e.g., the user may claim to be an authorized user of the financial account by requesting to conduct a financial transaction using the financial account). Method 500 may be implemented by a suitable computing system and/or any combination of computing systems or devices, as described herein. For example, method 500 may be implemented in any suitable computing environment by a computing device and/or combination of computing devices, such as computing devices 101, 105, 107, and 109 of FIG. 1 and/or by any one or more of the components depicted in any of FIGS. 1-3. Method 500 may be implemented in suitable program instructions, such as in software 127, and may operate on data, such as data 129. Method 500 may be implemented by the system 300 and/or any component thereof.

At 502, first data corresponding to a first plurality of transactions associated with a financial account of a user may be received. The financial account may be any type of financial account such as, for example, a credit card account or a checking account.

At 504, a plurality of transaction features may be defined. The features may be defined based on the first data corresponding to the first plurality of transactions. In various embodiments, the plurality of transaction features may include an indicator of a time of each transaction, an indicator of an amount of each transaction, an indicator of a type of each transaction, and an indicator of a source of funds for each transaction. In general, any number and any type of features may be defined to characterize any aspect of any transaction associated with the financial account.

At 506, an acknowledgement of at least one transaction feature of the plurality of transaction features for at least one transaction of the first plurality of transactions may be received. The acknowledgement may be received from the user. In various embodiments, the acknowledgement may indicate that the at one least transaction feature was remembered by the user. In various embodiments, user acknowledgement may be used to indicate to an ML model or application what transaction features (e.g., either generally by category or specifically relating to a particular transaction) the user remembers.

At 508, an ML model may be trained to determine a likelihood the user will acknowledge a particular transaction. The ML model may be trained based on the first plurality of transactions, the plurality of transaction features, and the acknowledgement of the at least one transaction feature of the plurality of transaction features for the at least one transaction of the first plurality of transactions. In various embodiments, the ML model may be trained to recognize what a particular user may acknowledge as memorable based on features of one or more transactions that the user indicates as memorable or as not memorable. The ML model may be the same or similar to any of the ML models discussed herein.

At 510, a request for authorization to perform a current financial transaction may be received. The request may be any type of request such as, for example, a request to transfer funds of a checking account to another financial account of another financial institution. The request may originate and may be received from the financial account of the user. In various embodiments, it may be indeterminable whether the actual owner of the financial account issued the request. That is, it may be indeterminable whether the user requesting the transaction (e.g., who may even be logged into the financial account) is the actual owner or authorized user of the account.

At 512, second data indicative of a second plurality of transactions associated with the financial account of the user may be received. The second data may relate to transactions involving the financial account for a corresponding period of time. For example, the second data may relate to transactions that were conducted in the last month or some other period of time. In various embodiments, the financial account may be associated with one or more authorized users. The authorized user requesting the current financial transaction may be identified. In turn, financial transaction data of the identified user making the request may be distinguished from financial transaction data of another authorized user of the account who is not making the request. The financial data of the non-requesting authorized user may be removed from the second data indicative of a second plurality of transactions associated with the financial account. In this manner, data particular to the particular requesting user may be identified and used. In various embodiments, financial transactional data of a particular user may be included or excludes based on location data of any authorized user of the financial account as described herein.

At 514, a value for each transaction of the second plurality of transactions indicating a likelihood the user remembers the transaction may be determined. The value may be determined using the ML model and based on the received second data. The ML model may operate to recognize or determine one or more transactions from the second plurality of transactions that the user is likely to remember. The value determined may reflect or may indicate a measure of such determined likelihood.

At 516, the determined value for each transaction of the second plurality of transactions may be compared to a predetermined threshold. The predetermined threshold may be set to any value.

At 518, a subset of the second plurality of transactions may be determined. The subset may represent transactions that the user is likely to remember, based on the value of each transaction of the subset of the second plurality of transactions satisfying the predetermined threshold. In various embodiments, the value of a transaction may satisfy the predetermined threshold by meeting (e.g., equaling) or exceeding (e.g., being greater than) the predetermined threshold.

At 520, one or more authorization questions based on transactional data of the determined subset of the second plurality of transactions may be determined. In various embodiments, one or more questions for each determined transaction may be determined. The authorization questions may relate to any feature of any transaction as described herein. Predetermined correct answers corresponding to each authorization question may also be determined.

At 522, the one or more generated authorization questions may be provided to the user. The authorization questions may be provided to the user in response to the request for authorization to perform the current financial transaction. The authorization questions may be provided to the user via any type of device such as, for example, a device used by the user to issue the request to perform a financial transaction. The authorization questions may be provided to the user via a device that includes a user interface and/or a display (e.g., a touchscreen display).

At 524, a determination whether to grant the request for authorization to perform the current financial transaction may be made. The determination may be based on one or more corresponding responses to the one or more generated authorization questions. In various embodiments, the determination may be based on whether the user correctly responds to each question. As an example, the request for authorization may be granted if the user answers each questions correctly. The request for authorization may be denied if the user answers some threshold number of questions incorrectly.

The method 500 enables an individual to be authenticated based on the individual's responses to authorization questions based on transactions that a true owner or authorized user of a financial account is likely to remember. Accordingly, the method 500 provides a more reliable technique for authenticating the user.

Figure 6:
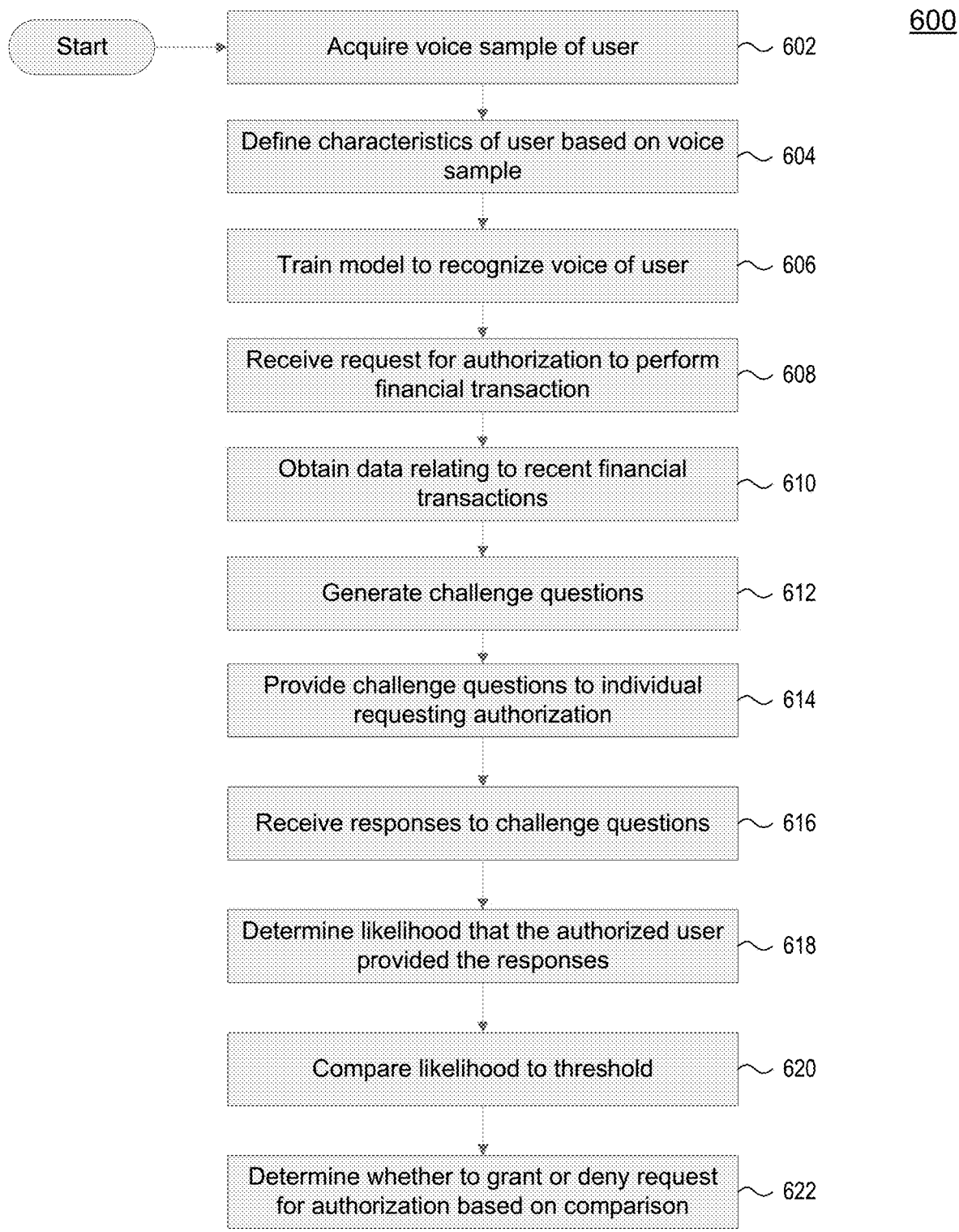
FIG. 6 depicts a flowchart for a second method for authenticating a user in accordance with one or more aspects described herein.

Discussion will now turn to FIG. 6 which illustrates an example method 600 for authenticating a user in accordance with one or more aspects described herein. Method 600 may authenticate a user based on behavioral biometric data of a user. Behavioral biometric data of the user may be collected in response to the user answering one or more questions relating to a financial account of the user and/or the user answering one or more questions relating to one or more particular transactions conducted by the user. In various embodiments, the user may claim to be an authorized user of the financial account by requesting to conduct a financial transaction using the financial account. Method 600 may be implemented by a suitable computing system and/or any combination of computing systems or devices, as described herein. For example, method 600 may be implemented in any suitable computing environment by a computing device and/or combination of computing devices, such as computing devices 101, 105, 107, and 109 of FIG. 1 and/or by any one or more of the components depicted in any of FIGS. 1-3. Method 600 may be implemented in suitable program instructions, such as in software 127, and may operate on data, such as data 129. Method 600 may be implemented by the system 300 and/or any component thereof.

At 602, voice data corresponding to a user may be received. The voice data may correspond to a known user—for example, a verified individual who is an owner or authorized user of a financial account. The voice data may be obtained by any means or mechanism. In various embodiments, voice data may be obtained when the user registers for online access to the user's financial account. A voice sample from the user may be collected and stored as part of the registration process.

At 604, a plurality of characteristics of the user based on the voice data corresponding to the user may be defined. The plurality of characteristics may include any number and any type of characteristics such as, for example, those commonly used for defining a user's speech or speech patterns, hesitations, and/or pronunciations.

At 606, a machine learning model may be trained to recognize the user based on one or more characteristics of the plurality of characteristics of the user. The ML model may be trained using the voice sample from the user and the defined characteristics of the user.

At 608, a request for authorization to perform a current financial transaction may be received. The request may be received from a financial account associated with the user. As an example, an individual may be logged into the user's financial account and may request that a certain financial transaction be performed. The request may be any type of request such as, for example, a request to transfer funds of a checking account to another financial account of another financial institution.

At 610, data associated with one or more prior financial transactions of the user may be determined. The data may relate to transactions involving the financial account for a corresponding period of time. For example, the data may relate to transactions that were conducted in the last month or some other period of time.

At 612, one or more challenge questions based on the one or more prior financial transactions of the user may be generated. The challenge questions may relate to any feature of any transaction as described herein. Predetermined correct answers corresponding to each challenge question may also be determined.

At 614, the one or more challenge questions may be provided to the individual making the request for authorization to perform the current financial transaction. For example, an individual (who may or may not be the authorized user of the account) may be logged into the financial account and may cause the current financial transaction to be requested from the financial account. The challenge questions may be presented to this individual—for example, on a computing device used by the individual causes the request to be issued. In various embodiments, a challenge question may be presented as a request to audibly read back information displayed on a device (e.g., when the individual is logged into the financial account).

At 616, one or more audible responses to each of the one or more challenge questions may be received. The audible response may be recorded and stored. In various embodiments touch input responses (e.g., swipes or swipe patterns) may also be obtained.

At 618, a likelihood that the user provided the one or more audible responses (and/or touch input responses) may be determined. The likelihood may be determined based on the machine learning model and based on the one or more received audible responses.

At 620, the determined likelihood may be compared to a predetermined threshold. The predetermined threshold may be set to any value.

At 622, a determination whether to grant the request for authorization to perform the current financial transaction may be determined. The request may be granted based on a determination that the determined likelihood satisfies (e.g., meets or exceeds) the predetermined threshold. The request may be denied based on a determination that the determined likelihood does not satisfy (e.g., is less than) the predetermined threshold.

The method 600 enables an individual to be authenticated in a more reliable manner based on behavioral biometrics data extracted from responses of the individual that is being authenticated. In various embodiments, the method 500 and the method 600 may be combined in any manner.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method comprising:
  determining, by a first computing device, a plurality of transaction features based on first data corresponding to a first plurality of transactions associated with a financial account, wherein the financial account is associated with a first user and a second user;
  generating, by the first computing device, first training data based on:
    the first plurality of transactions,
    the plurality of transaction features, and
    a user acknowledgement of at least one transaction feature of the plurality of transaction features for at least one transaction of the first plurality of transactions;
  generating, by the first computing device, second training data based on the plurality of transaction features;
  generating a first trained machine learning model by training, based on the first training data, a first machine learning model to determine a likelihood the first user will acknowledge a particular transaction;
  generating a second trained machine learning model by training, based on the second training data, a second machine learning model to identify one or more features of a transaction that a user is likely to remember;
  receiving, by the first computing device, a request for authorization to perform a current financial transaction;
  receiving, by the first computing device, second data indicative of a second plurality of transactions associated with the financial account;
  generating, by the first computing device and based on location histories associated with the first user and the second user, third data indicative of a third plurality of transactions associated with the financial account, wherein the third plurality of transactions excludes transactions from the second plurality of transactions that were conducted by the second user;
  providing, as first input to the first trained machine learning model, the third data;
  receiving, as output from the first trained machine learning model and in response to the first input to the first trained machine learning model, a value for each transaction of the third plurality of transactions indicating a likelihood the first user remembers the transaction;
  comparing the value for each transaction of the third plurality of transactions to a predetermined threshold;
  determining a subset of the third plurality of transactions, wherein the value for each transaction of the subset of the third plurality of transactions is greater than the predetermined threshold;

providing, as second input to the second trained machine learning model, information associated with the subset of the third plurality of transactions;
receiving, as second output from the second trained machine learning model, an identification of one or more features of one or more of the subset of the third plurality of transactions;
generating, by the first computing device, one or more authorization questions based on the one or more features of one or more of the subset of the third plurality of transactions;
receiving, from a first user computing device, behavioral biometric data corresponding to one or more corresponding responses to the one or more authorization questions;
providing, as input to a third trained machine learning model, the behavioral biometric data, wherein the third trained machine learning model is different from the first trained machine learning model and the second trained machine learning model; and
transmitting, based on output of the third trained machine learning model, an indication that the current financial transaction is approved.

2. The method of claim 1, wherein the behavioral biometric data indicates one or more of:
voice tone,
voice cadence,
dialect, or
slang.

3. The method of claim 1, wherein the transmitting the indication that the current financial transaction is approved comprises determining how long it took for the one or more corresponding responses to be received by the first user computing device.

4. The method of claim 1, wherein the plurality of transaction features comprise one or more of:
an indicator of a time of each transaction,
an indicator of an amount of each transaction,
an indicator of a type of each transaction, and
an indicator of a source of funds for each transaction.

5. The method of claim 1, wherein the transmitting the indication that the current financial transaction is approved comprises comparing the behavioral biometric data to stored behavioral biometric data corresponding to the first user.

6. The method of claim 5, further comprising:
updating, based on the behavioral biometric data, the stored behavioral biometric data.

7. The method of claim 1, wherein the third trained machine learning model is trained to recognize behavioral biometric data of the first user.

8. The method of claim 1, further comprising:
receiving video of the first user providing the one or more corresponding responses to the one or more authorization questions, wherein the behavioral biometric data is based on the video.

9. A first computing device comprising:
one or more processors; and
memory storing instructions that, when executed by the one or more processors, cause the first computing device to:
determine a plurality of transaction features based on first data corresponding to a first plurality of transactions associated with a financial account, wherein the financial account is associated with a first user and a second user;
generate first training data based on:
the first plurality of transactions,
the plurality of transaction features, and
a user acknowledgement of at least one transaction feature of the plurality of transaction features for at least one transaction of the first plurality of transactions;
generate second training data based on the plurality of transaction features;
generate a first trained machine learning model by training, based on the first training data, a first machine learning model to determine a likelihood the first user will acknowledge a particular transaction;
generate a second trained machine learning model by training, based on the second training data, a second machine learning model to identify one or more features of a transaction that a user is likely to remember;
receive a request for authorization to perform a current financial transaction;
receive second data indicative of a second plurality of transactions associated with the financial account;
generate, based on location histories associated with the first user and the second user, third data indicative of a third plurality of transactions associated with the financial account, wherein the third plurality of transactions excludes transactions from the second plurality of transactions that were conducted by the second user;
provide, as first input to the first trained machine learning model, the third data;
receive, as output from the first trained machine learning model and in response to the first input to the first trained machine learning model, a value for each transaction of the third plurality of transactions indicating a likelihood the first user remembers the transaction;
compare the value for each transaction of the third plurality of transactions to a predetermined threshold;
determine a subset of the third plurality of transactions, wherein the value for each transaction of the subset of the third plurality of transactions is greater than the predetermined threshold;
provide, as second input to the second trained machine learning model, information associated with the subset of the third plurality of transactions;
receive, as second output from the second trained machine learning model, an identification of one or more features of one or more of the subset of the third plurality of transactions;
generate one or more authorization questions based on the one or more features of one or more of the subset of the third plurality of transactions;
receive, from a first user computing device, behavioral biometric data corresponding to one or more corresponding responses to the one or more authorization questions;
provide, as input to a third trained machine learning model, the behavioral biometric data, wherein the third trained machine learning model is different from the first trained machine learning model and the second trained machine learning model; and
transmit, based on output of the third trained machine learning model, an indication that the current financial transaction is approved.

10. The first computing device of claim 9, wherein the behavioral biometric data indicates one or more of:

voice tone,
voice cadence,
dialect, or
slang.

11. The first computing device of claim 9, wherein the instructions, when executed by the one or more processors, cause the first computing device to transmit the indication that the current financial transaction is approved by causing the first computing device to determine how long it took for the one or more corresponding responses to be received by the first user computing device.

12. The first computing device of claim 9, wherein the plurality of transaction features comprise one or more of:
an indicator of a time of each transaction,
an indicator of an amount of each transaction,
an indicator of a type of each transaction, and
an indicator of a source of funds for each transaction.

13. The first computing device of claim 9, wherein the instructions, when executed by the one or more processors, cause the first computing device to transmit the indication that the current financial transaction is approved by causing the first computing device to compare the behavioral biometric data to stored behavioral biometric data corresponding to the first user.

14. The first computing device of claim 13, wherein the instructions, when executed by the one or more processors, cause the first computing device to:
update, based on the behavioral biometric data, the stored behavioral biometric data.

15. The first computing device of claim 9, wherein the third trained machine learning model is trained to recognize behavioral biometric data of the first user.

16. The first computing device of claim 9, wherein the instructions, when executed by the one or more processors, further cause the first computing device to:
receive video of the first user providing the one or more corresponding responses to the one or more authorization questions, wherein the behavioral biometric data is based on the video.

17. One or more non-transitory computer-readable media storing instructions that, when executed by one or more processors of a first computing device, cause the first computing device to:
determine a plurality of transaction features based on first data corresponding to a first plurality of transactions associated with a financial account, wherein the financial account is associated with a first user and a second user;
generate first training data based on:
the first plurality of transactions,
the plurality of transaction features, and
a user acknowledgement of at least one transaction feature of the plurality of transaction features for at least one transaction of the first plurality of transactions;
generate second training data based on the plurality of transaction features;
generate a first trained machine learning model by training, based on the first training data, a first machine learning model to determine a likelihood the first user will acknowledge a particular transaction;
generate a second trained machine learning model by training, based on the second training data, a second machine learning model to identify one or more features of a transaction that a user is likely to remember;
receive a request for authorization to perform a current financial transaction;
receive second data indicative of a second plurality of transactions associated with the financial account;
generate, based on location histories associated with the first user and the second user, third data indicative of a third plurality of transactions associated with the financial account, wherein the third plurality of transactions excludes transactions from the second plurality of transactions that were conducted by the second user;
provide, as first input to the first trained machine learning model, the third data;
receive, as output from the first trained machine learning model and in response to the first input to the first trained machine learning model, a value for each transaction of the third plurality of transactions indicating a likelihood the first user remembers the transaction;
compare the value for each transaction of the third plurality of transactions to a predetermined threshold;
determine a subset of the third plurality of transactions, wherein the value for each transaction of the subset of the third plurality of transactions is greater than the predetermined threshold;
provide, as second input to the second trained machine learning model, information associated with the subset of the third plurality of transactions;
receive, as second output from the second trained machine learning model, an identification of one or more features of one or more of the subset of the third plurality of transactions;
generate one or more authorization questions based on the one or more features of one or more of the subset of the third plurality of transactions;
receive, from a first user computing device, behavioral biometric data corresponding to one or more corresponding responses to the one or more authorization questions;
provide, as input to a third trained machine learning model, the behavioral biometric data, wherein the third trained machine learning model is different from the first trained machine learning model and the second trained machine learning model; and
transmit, based on output of the third trained machine learning model, an indication that the current financial transaction is approved.

18. The one or more non-transitory computer-readable media of claim 17, wherein the behavioral biometric data indicates one or more of:
voice tone,
voice cadence,
dialect, or
slang.

19. The one or more non-transitory computer-readable media of claim 17, wherein the instructions, when executed by the one or more processors, cause the first computing device to transmit the indication that the current financial transaction is approved by causing the first computing device to determine how long it took for the one or more corresponding responses to be received by the first user computing device.

20. The one or more non-transitory computer-readable media of claim 17, wherein the plurality of transaction features comprise one or more of:
an indicator of a time of each transaction,
an indicator of an amount of each transaction,
an indicator of a type of each transaction, and
an indicator of a source of funds for each transaction.

* * * * *